Jan. 5, 1932.  H. HOOVER  1,839,315
MOVING PICTURE PROJECTOR
Filed April 26, 1928   3 Sheets-Sheet 1
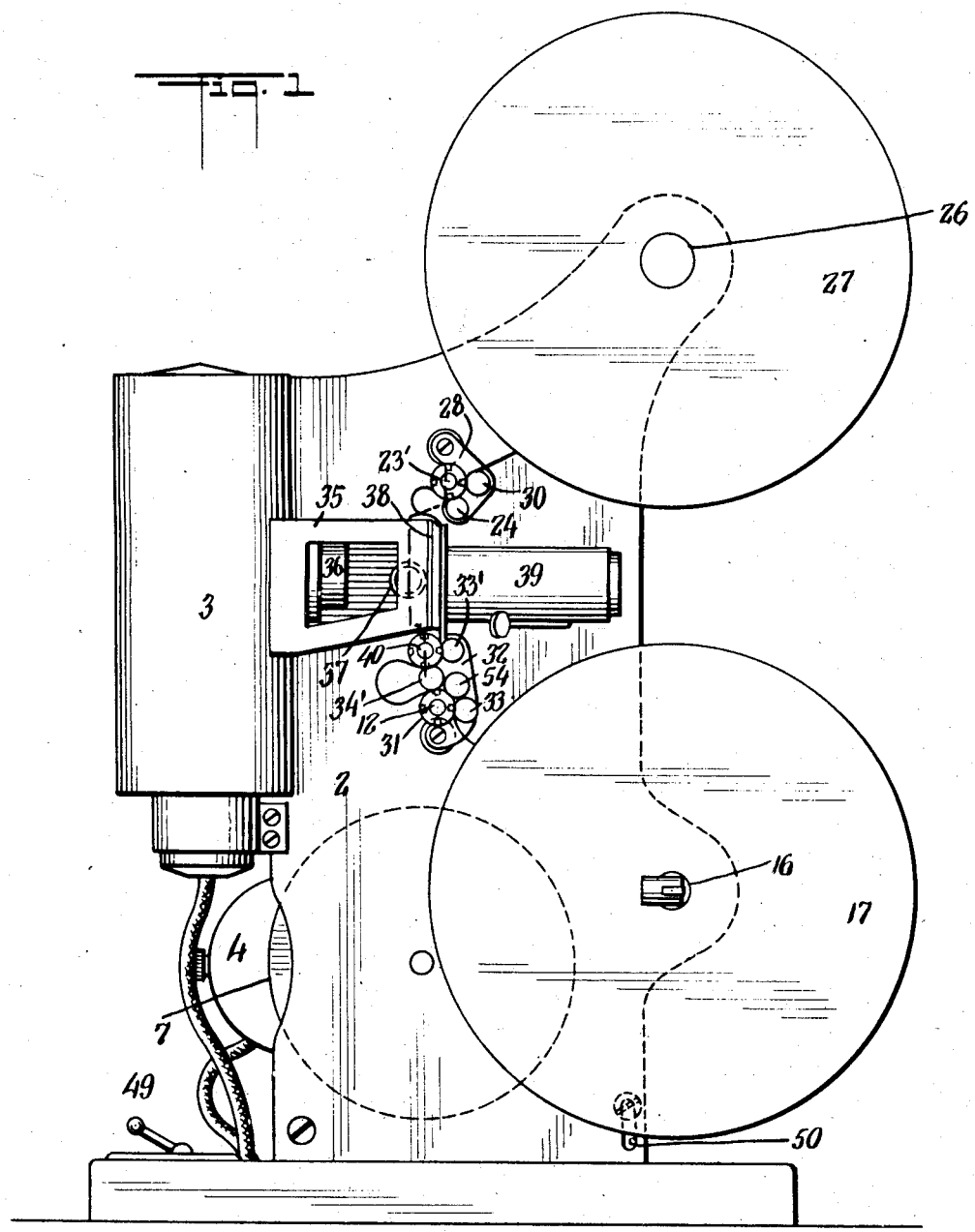
INVENTOR
*Harry Hoover*
BY
*Robert M Kilgore*
ATTORNEY Jan. 5, 1932.  H. HOOVER  1,839,315
MOVING PICTURE PROJECTOR
Filed April 26, 1928  3 Sheets-Sheet 2
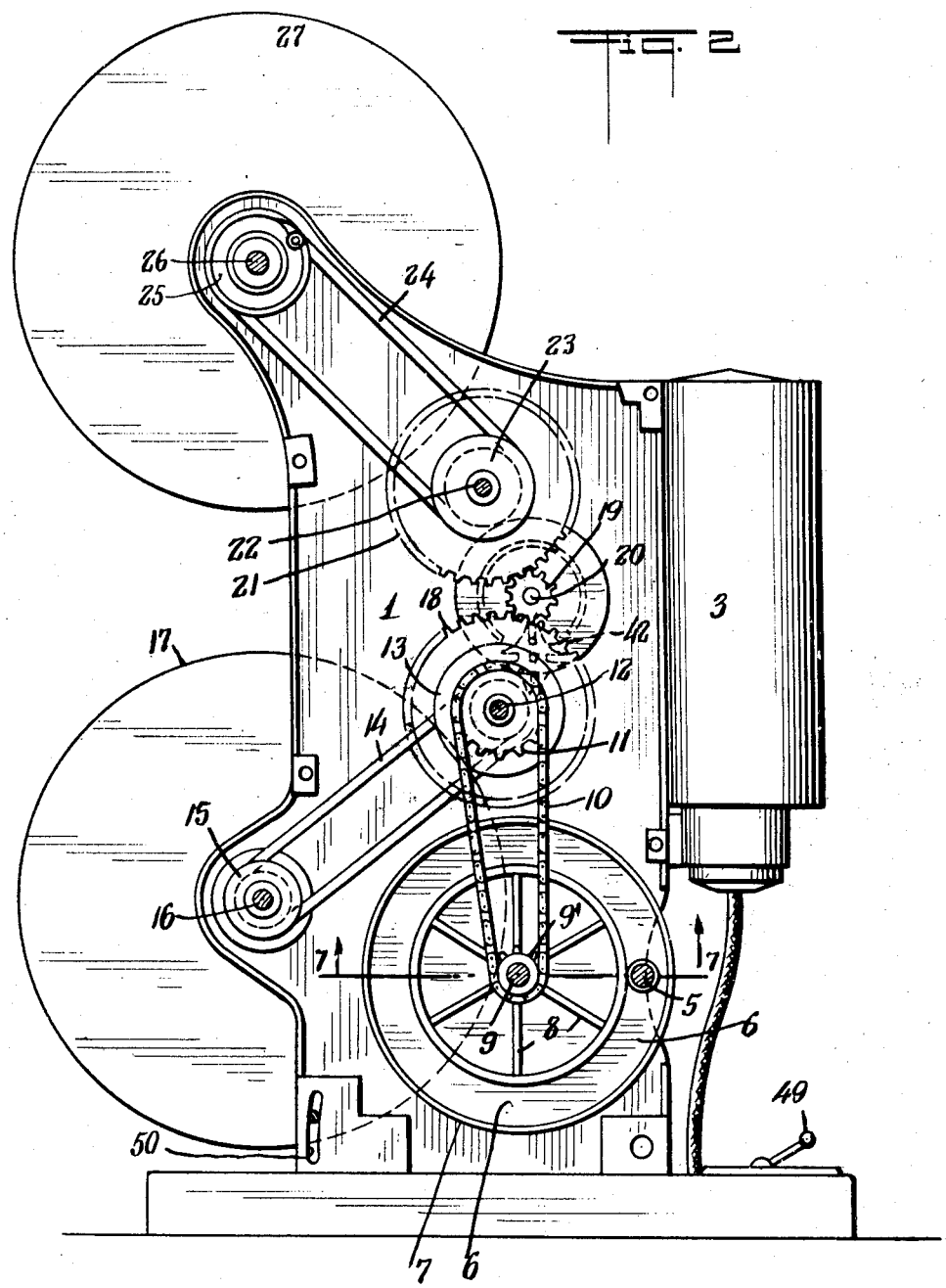
INVENTOR
Harry Hoover
BY
ATTORNEY Jan. 5, 1932.  H. HOOVER  1,839,315
MOVING PICTURE PROJECTOR
Filed April 26, 1928  3 Sheets-Sheet 3
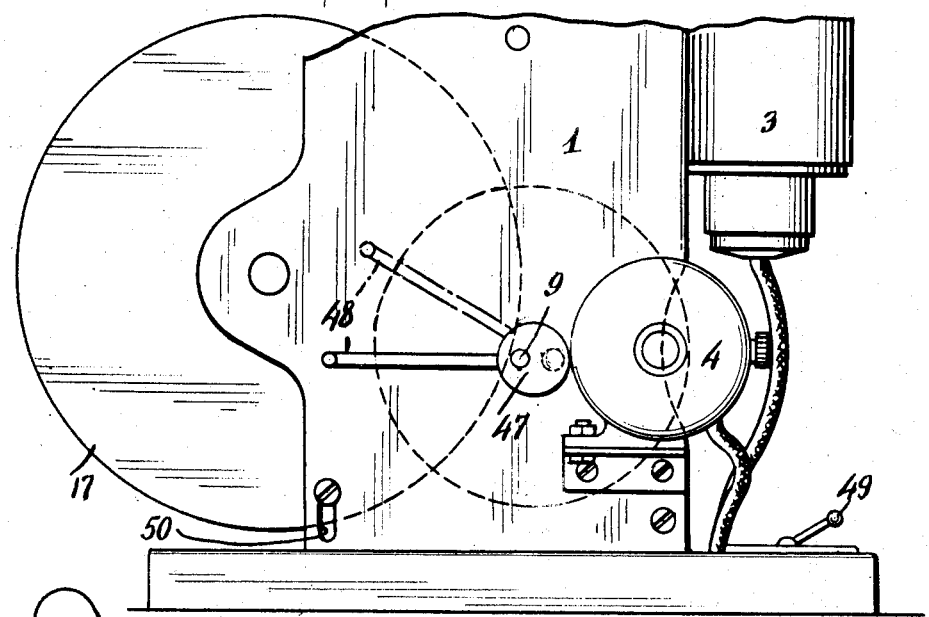
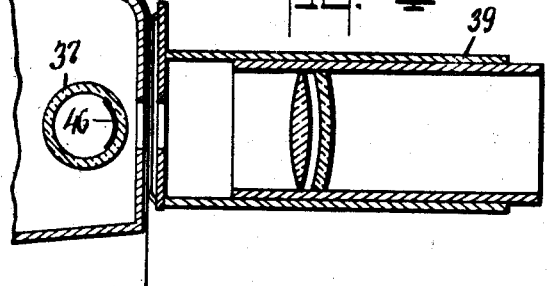
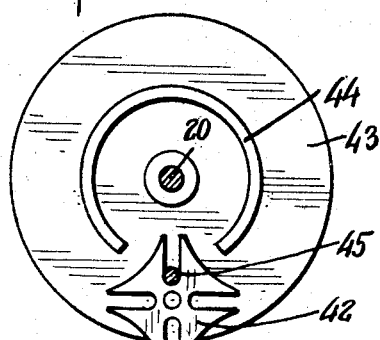
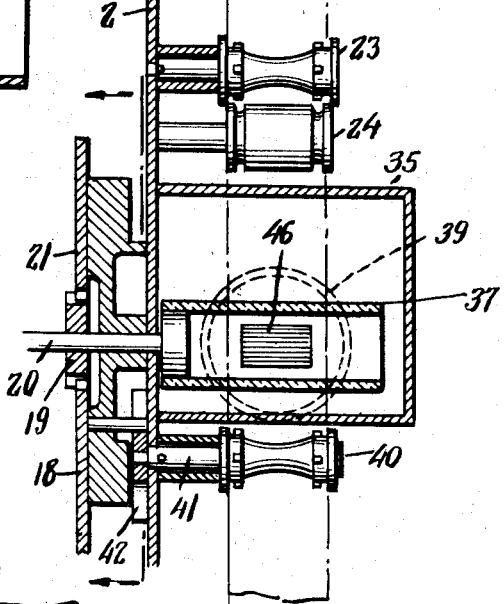
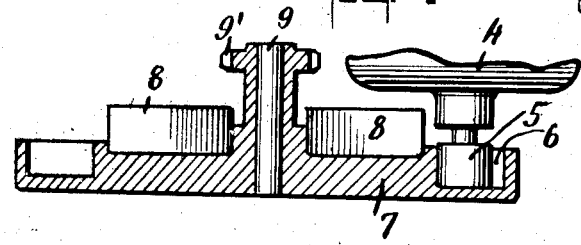
INVENTOR
*Harry Hoover*
BY
ATTORNEY Patented Jan. 5, 1932

1,839,315

UNITED STATES PATENT OFFICE

HARRY HOOVER, OF NEW YORK, N. Y., ASSIGNOR TO ABE MASKOW, OF NEW YORK, N. Y.

MOVING PICTURE PROJECTOR

Application filed April 26, 1928. Serial No. 273,014.

My invention relates to moving picture projectors, especially those intended for the projection of 16 mm. film, and it is my object to produce a projector which will be simple, cheap and efficient, in which the light passes directly from the lamp to the film and lenses, to locate the shutter between the lamp and film to eliminate blistering or burning of the film, to provide means whereby the film can be stopped, reversed or rewound at will, and to provide efficient cooling means for the machine and film.

In the drawings Fig. 1 is a view of one side of the projector; Fig. 2 a view of the opposite side of the projector; Fig. 3 a detail view of the reverse and rewinding mechanism; Fig. 4 a detail view of the shutter mechanism; Fig. 5 a detail view of the shutter mechanism and feed rolls; Fig. 6 a detail view of the Maltese-cross or Geneva movement mechanism for moving the intermittent pull down sprocket; and Fig. 7 a detail view of the drive and rewind mechanism.

The projector comprises two side plates 1 and 2 spaced apart with a lamp housing 3 in the rear thereof.

Describing the parts shown in Fig. 1, the driving power is furnished by an electric motor 4 whose shaft carries a friction roll 5. This friction roll engages a circular groove 6 in the main drive wheel 7 which revolves on the plate 1. The friction drive enables the roller to slip in the groove if for any reason the film jams in the feeding mechanism and tends to prevent tearing and breaking of the film. The wheel 7 is provided with fan blades 8 which force air through the projector when in operation so that the parts and film will not become unduly heated. The wheel 7 also carries a sprocket wheel 9 over which a chain 10 runs. The chain 10 also runs over another sprocket wheel 11 on a shaft 12 which passes through the side plates 1 and 2 and carries the take up-sprocket. The shaft 12 carries a pulley 13 over which a belt 14 runs. This belt 14 also runs over a pulley 15 on the shaft 16 which revolves the take up reel 17 which is secured thereon in any suitable manner which permits its insertion and removal.

The shaft 12 carries a gear 18 which meshes with a pinion 19 on the shaft 20, which shaft carries the shutter. The pinion 19 engages a gear 21 on the shaft 22 which shaft passes through the plates and carries the upper feed sprocket. The shaft 22 also carries a pulley 23 over which a belt 24 passes. The belt also passes over a pulley 25 on a shaft 26 which shaft carries the supply reel 27, any suitable means for detachably securing the same thereon being provided.

Describing the parts shown in Fig. 2 the upper feed sprocket 23', carrying four teeth, has an arm 28 swingingly mounted adjacent it which arm carries two rollers 24 and 30 which serve to keep the film perforations meshed with the sprocket teeth. This sprocket draws the film from the supply reel and feeds it to the intermittent pull-down sprocket.

The lower feed sprocket 31 has a swingingly mounted arm 32 adjacent to it which carries three rollers 33, 33' and 54 which serve to keep the film perforations meshed with the four sprocket teeth which serve to draw the film from the intermittent pull-down sprocket and feed it to the take-up reel.

The small housing 35 encloses the condensers 36, shutter 37, gate 38 and carries the projecting lens 39.

The intermittent feed sprocket 40 revolves with a shaft 41 mounted on the side plate 2, which shaft carries the Maltese cross 42. The shutter shaft 20 carries the complementary member of the Maltese cross movement and comprises a disk 43 having an interrupted circular rib 44 on its face and a pin 45. The pin 45 enters the slots in the Maltese cross 42 while the rib 44 bears against the outer edge of the arms of the cross to hold the intermittent pull-down sprocket stationary between movements. The disk 43 is constantly revolving with the shutter and as the pin 45 reaches a slot in the cross the gap in the disk rib 44 permits the Maltese cross to give a quarter turn thus giving the intermittent pull down sprocket a quarter turn this moving the film one frame. The intermittent pull-down sprocket also has but four teeth.

The arm 32 also carries two additional rollers 33' and 34' which serve to keep the film perforations in engagement with the teeth on the intermittent pull-down sprocket 40.

The shutter 37 is a glass tube having an opaque spot 46 thereon. This glass tube is located between the film gate and the condensers so that the light rays must pass through two glass walls before reaching the film thereby cutting off the greater part of the heat rays and preventing blistering of the film. This permits locating the lamp in direct line with the film and lenses instead of at right angles thereto with a prism to direct the light to the lenses and affords greater illumination. This tubular shutter is mounted on the shaft 20 and constantly revolves.

The rewind and reversing mechanism consists of a circular groove 6 on the wheel 7 and the roller 5 on the motor shaft. The groove is considerably wider than the diameter of the roller and the shaft 9 is eccentrically mounted in a bearing plate 47 in the side frame 1, a corresponding plate being used in the plate 2. On swinging the handle 48 up or down the fly wheel 7 with its groove 6 is moved from one side to the other with respect to the roller 5. When the roller contacts with the large diameter of the groove the projection drive is in use. When the roller contacts with the small diameter of the groove the reverse or rewind is in use, the speed being higher so that the rewind is faster than the projection of the film.

The motor has the usual starting and stopping switch 49 of any desired type.

Slot, plate and screw devices 50 at the lower, front portion of the side plates permit the machine to be tilted on its base to position the image on the screen.

In use the film to be exhibited is wound onto the supply reel 27. The arm 28 is swung away from the feed sprocket 23 and the film perforations engaged with the teeth on the sprocket after which the arm is swung back so that the rollers will maintain the film in place. A loop is formed in the film and it is slid into the gate 38. The arm 32 is then swung out and the film perforations engaged with the teeth on the intermittent pull-down sprocket 40. A second loop is formed in the film and the perforations are then engaged with the teeth on the sprocket 31. The arm 32 is then swung back so that the rollers will maintain the film in engagement with the sprockets. The free end of the film is then attached to the take up reel 17.

On running the motor the reels 17 and 27, sprockets 23 and 31 and shutter 37 are constantly revolved while the pull-down sprocket 40 is intermittently revolved by the Maltese cross movement. The movement of the sprocket 40 is so timed that as the opaque spot on the revolving glass tube shutter cuts off the light from the film the sprocket makes a quarter turn and pulls one frame of film down to be projected as soon as the opaque spot clears the gate opening.

The gate is vertically movable as is customary in all projecting machines so that the film may be accurately framed on the screen.

The use of but four teeth on all three sprockets reduces the wear and tear on the film and the use of a plurality of rollers makes the feed positive.

It is apparent that my projector has but few parts, of large size and long wearing qualities and that it may be cheaply built and easily assembled so that it can be sold at a low price.

I claim:—

1. In a moving picture projector, a source of illumination, a gate through which film is fed, a shutter comprising a transparent glass tube located between the source of illumination and the gate whereby the intensity of heat rays on the film is diminished, an opaque spot of sufficient area and suitably positioned to obscure the film in the gate during movement of same on said tube means for rotating said tube and means for intermittently moving film through the gate in synchronism with the shutter.

2. In a moving picture projector, a feed sprocket, an arm swingingly mounted adjacent the sprocket, rollers on said arm adapted to contact with said sprocket, a film gate, a pull down sprocket below said gate, means for intermittently rotating said pull down sprocket, a shutter comprising a transparent glass tube located between the source of illumination and the gate whereby the intensity of heat rays on the film is diminished, an opaque spot of sufficient area and suitably positioned to obscure the film in the gate during movement of same on said tube, means for rotating said tube operating in synchronism with the pull down sprocket, a second feed sprocket adjacent the pull down sprocket, a second arm swingingly mounted adjacent the second sprocket, rollers on said arm adapted to contact with the pull down and second sprockets, and means for continuously rotating said feed sprockets and shutter.

In testimony whereof I have hereunto subscribed my name.

HARRY HOOVER.